United States Patent
Tang et al.

(10) Patent No.: US 9,959,060 B1
(45) Date of Patent: May 1, 2018

(54) DATA SEPARATION DURING HOST WRITE WITH STORAGE ALLOCATED BASED ON TRAFFIC PROFILES

(71) Applicant: SK hynix Inc., Gyeonggi-do OT (KR)

(72) Inventors: Xiangyu Tang, San Jose, CA (US); Lingqi Zeng, San Jose, CA (US)

(73) Assignee: SK Hynix Inc., Gyeonggi-go (KR)

( * ) Notice: Subject to any disclaimer, the term of this patent is extended or adjusted under 35 U.S.C. 154(b) by 0 days. days.

(21) Appl. No.: 14/825,537

(22) Filed: Aug. 13, 2015

Related U.S. Application Data (60) Provisional application No. 62/050,947, filed on Sep. 16, 2014.

(51) Int. Cl.
*G06F 3/06* (2006.01)

(52) U.S. Cl.
CPC ............ *G06F 3/0619* (2013.01); *G06F 3/061* (2013.01); *G06F 3/065* (2013.01); *G06F 3/0655* (2013.01); *G06F 3/0679* (2013.01); *G06F 2206/1014* (2013.01)

(58) Field of Classification Search
CPC ...... G06F 3/0619; G06F 3/065; G06F 3/0655; G06F 3/0679; G06F 3/061; G06F 3/0611; G06F 3/0613; G06F 3/0629; G06F 3/0631; G06F 3/0638; G06F 3/064; G06F 3/0644; G06F 2206/1014; G06F 12/0246; G06F 12/0238; G06F 12/0253; G06F 2212/72; G06F 2212/7202; G06F 2212/7207

See application file for complete search history.

(56) References Cited

U.S. PATENT DOCUMENTS

| | | | |
|---|---|---|---|
| 2005/0081009 A1* | 4/2005 | Williams ............... | G06F 3/061 711/163 |
| 2008/0082729 A1* | 4/2008 | Moon ................. | G06F 12/0246 711/103 |
| 2011/0057937 A1* | 3/2011 | Wu ..................... | G06F 15/8023 345/505 |
| 2011/0069521 A1* | 3/2011 | Elfadel .................. | G11C 8/10 365/46 |
| 2011/0138148 A1* | 6/2011 | Friedman .............. | G06F 3/0613 711/173 |
| 2012/0209893 A1* | 8/2012 | Kim .................. | G06F 17/30129 707/822 |
| 2012/0239862 A1* | 9/2012 | Seo ..................... | G06F 12/0246 711/103 |
| 2013/0061019 A1* | 3/2013 | Fitzpatrick .......... | G06F 11/3485 711/173 |
| 2014/0143474 A1* | 5/2014 | Damle ................ | G06F 12/0246 711/103 |
| 2014/0254042 A1* | 9/2014 | Yeo .................... | G11B 20/1217 360/48 |

* cited by examiner

*Primary Examiner* — Michael Krofcheck
(74) *Attorney, Agent, or Firm* — IP & T Group LLP (57) ABSTRACT

A plurality of traffic profiles is determined for a plurality of traffic groups where each traffic profile includes a share of traffic and an address footprint size associated with a corresponding traffic group. A host write is received from a host and the traffic group that the host write belongs to is identified. Write data associated with the host write is stored in the solid state storage allocated to the traffic group that the host write is identified as belonging to where the amount of solid state storage allocated to each of the plurality of traffic groups is based at least in part on the traffic profile of a given traffic group.

17 Claims, 9 Drawing Sheets

DATA SEPARATION DURING HOST WRITE WITH STORAGE ALLOCATED BASED ON TRAFFIC PROFILES

CROSS REFERENCE TO OTHER APPLICATIONS

This application claims priority to U.S. Provisional Patent Application No. 62/050,947 entitled REDUCING WRITE AMPLIFICATION AND INCREASING QUALITY OF SERVICE THROUGH DATA SEPARATION DURING HOST WRITE filed Sep. 16, 2014 which is incorporated herein by reference for all purposes.

BACKGROUND OF THE INVENTION

One performance metric of particular interest in solid state storage systems (which is not of interest to other types of storage systems, such as hard disk drives) is write amplification. Write amplification is the ratio of host writes plus overhead writes, compared to host writes alone and is (generally speaking) one measure of the "efficiency" of solid state storage systems. Write amplification is of interest in solid state storage systems because programming and erasing cause the electrical insulation of solid state storage cells to break down, making the cells "leaky" and less able to hold charge for long periods of time. The ideal write amplification value is 1, because no overhead writes are performed when the write amplification value is 1.

It is known that storing hot data with hot data and cold data with cold data in the solid state storage media (i.e., data separation) tends to be better for write amplification. However, techniques which further improve the performance of the system (e.g., which further reduce write amplification) would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
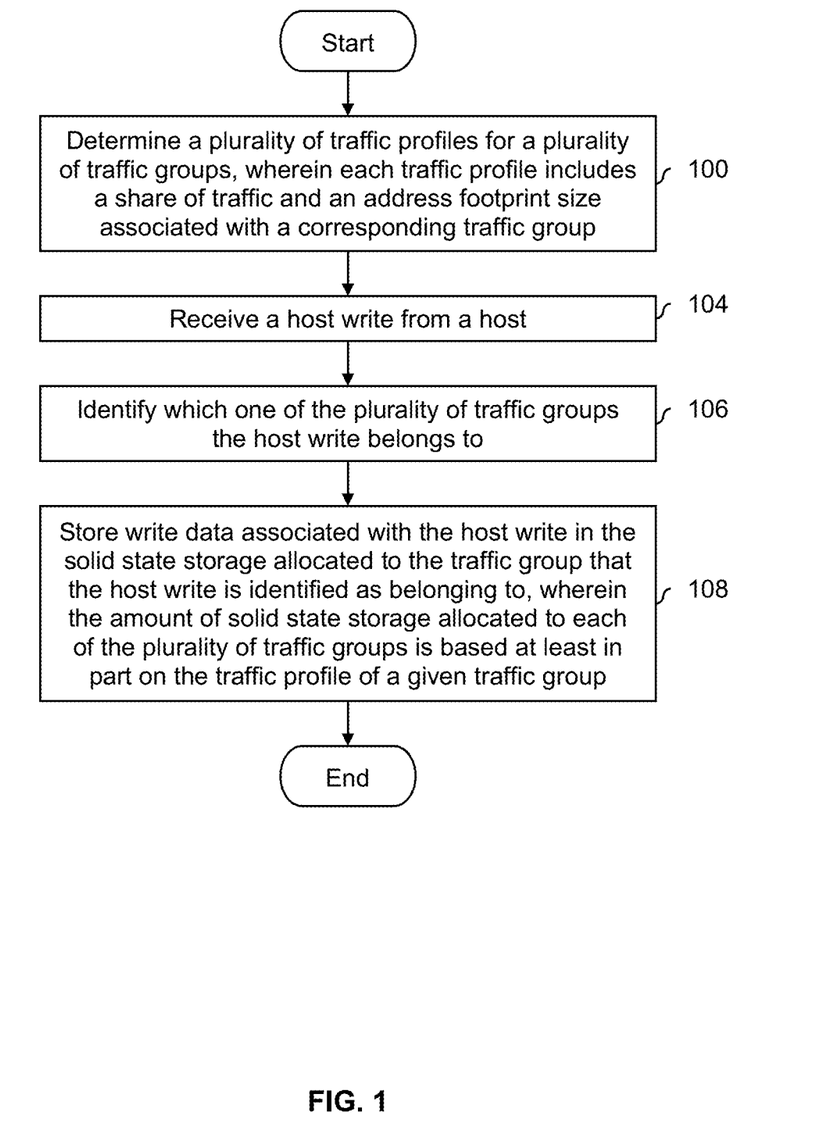
FIG. 1 is a flowchart illustrating an embodiment of a process for performing data separation during host writes.

FIG. 1 is a flowchart illustrating an embodiment of a process for performing data separation during host writes. In the example shown, the process is performed by a solid state storage controller. For example, the solid state storage controller may sit between a host and solid state storage media.

At 100, a plurality of traffic profiles is determined for a plurality of traffic groups, wherein each traffic profile includes a share of traffic and an address footprint size associated with a corresponding traffic group. For example, a share of traffic may be a percentage of traffic sent from a host to a solid state storage controller for a particular type of traffic (e.g., hot data, cold data, or warm data). Step 100 is sometimes referred to as host traffic profiling.

In some examples described below, there are three traffic groups. The first traffic group is associated with hot data (which will be described in more detail below), the second traffic group is associated with warm data, and the third traffic group is associated with cold data. For each of the three exemplary traffic groups, a traffic profile is generated at step 100 which includes a percentage of total (host) traffic (e.g., the hot data comprises 20% of all traffic from a host, the warm data comprises 30% of all traffic from a host, and the cold data comprises 50% of all traffic from a host) and address footprint size (e.g., the hot data is written to 50 logical block addresses, the warm data is written to 150 logical block addresses, and the cold data is written to 800 logical block addresses).

At 104, a host write is received from a host. In some embodiments, a solid state storage controller includes a host interface which manages communication between the solid state storage controller and the host. It is noted that traffic profiles determined at step 100 (in at least some embodiments) are determined by analyzing or otherwise processing host writes received from a host and thus the host write received at step 104 is not necessarily the first piece of host data received.

In some embodiments, until enough host writes have been received to sufficiently determine traffic profiles and allocate corresponding amounts of solid state storage to each of the traffic groups, a default amount of solid state storage is allocated for each of the traffic groups (e.g., the hot data is allocated a first default percentage of solid state storage that is available for host data, the warm data is allocated a second default percentage of solid state storage that is available for host data, and the cold data is allocated a third default percentage of solid state storage that is available for host data, where the three percentages sum to 100%). This enables the host data to be written to solid state storage until optimal and/or "customized" sizes can be determined.

At 106, it is identified which one of the plurality of traffic groups the host write belongs to. For example, the host write may be classified in the following manner. As part of the traffic profiling at step 100, count thresholds are generated which define the host count ranges which define a particular traffic group. The host data received at step 104 is directed to a logical block address at which the host data is to be written or stored. The system tracks host write counts for each logical block address (at least in this example) and obtains the host write count which corresponds to the logical block address being written to. The obtained host write count is compared against the count thresholds and depending upon where the count falls within the thresholds, the corresponding traffic group is selected.

At 108, write data associated with the host write is stored in the solid state storage allocated to the traffic group that the host write is identified as belonging to. For example, if the host write is identified at step 106 as being part of the hot data group, the write data associated with the host write is stored in storage allocated to hot data. This, for example, ensures that data is stored together with other data of the same temperature (e.g., hot data with hot data, warm data with warm data, and cold data with cold data). Keeping data with other data of the same temperature is sometimes referred to as data separation.

In some embodiments, the amount of storage allocated to a particular traffic group is the address footprint size for that traffic group plus that traffic group's share of any over-provisioning, where the share of over-provisioning depends upon the address footprint size and/or the percentage of traffic. Generally speaking, over-provisioning is extra capacity that is not advertised to the user. For example, a solid state storage drive that is advertised (e.g., to a user) as having a storage capacity of 250 GB and which has 7% over-provisioning would actually have 267.5 GB of physical storage. Over-provisioning may be desirable in solid state storage systems because it may extend the lifetime of the system.

In some embodiments, step 108 is performed by a storage interface in a solid state storage controller that is responsible for managing reads from and/or writes to the solid state storage media.

The process described in FIG. 1 has a number of benefits. One benefit is that data separation is performed at the host write (see, e.g., step 104, step 106, and step 108) instead of later on during garbage collection or wear leveling. This enables data to be properly stored with other data of the same temperature from the very beginning (e.g., when it is written to solid state storage media for the first time) and may result in better write amplification compared to if data separation begins at garbage collection or wear leveling (i.e., later on).

Another benefit to the process described in FIG. 1 is that the amount of solid state storage allocated takes into account the traffic profile for a particular traffic group. This enables a system which performs the process of FIG. 1 to be able to adapt dynamically to changes in traffic over time. For example, suppose initially a system experiences a lot of hot data and very little warm and cold data, but later the system experiences a lot of cold data and very little warm and hot data. The process of FIG. 1 is able to adapt to this and adjust the amounts of allocated storage accordingly.

Even if traffic is static and does not change, using traffic profiles to allocate storage may better "fit" the storage to the particular needs of a given traffic group so that write amplification is lower compared to fixed amounts of allocated storage. For example, the traffic models used to determine the fixed amounts of allocated storage may be a poor representation of the actual traffic observed by the system, which would cause write amplification to be higher than it could be.

The following figures show an example of how a traffic profile is determined in more detail.

Figure 2:
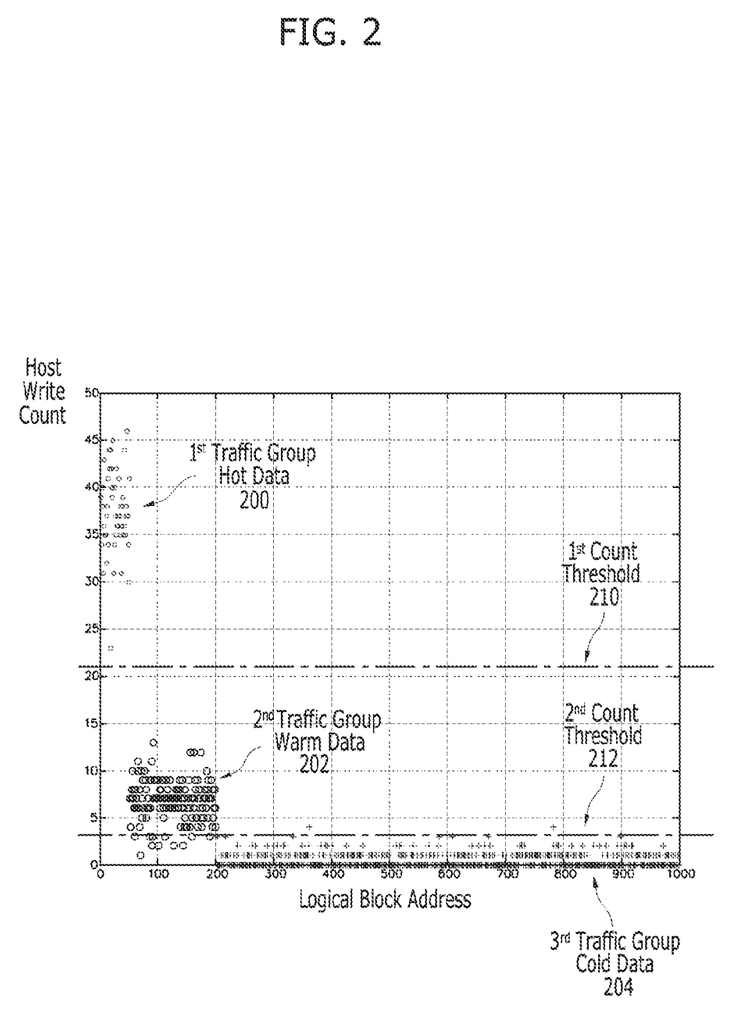
FIG. 2 is a diagram illustrating an embodiment of host write counts associated with three traffic groups at a first point in time.

FIG. 2 is a diagram illustrating an embodiment of host write counts associated with three traffic groups at a first point in time. In the example shown there are three traffic groups: hot data (200) shown with "•" marks, warm data (202) shown with "○" marks, and cold data (204) shown with "+" marks. The x-axis is logical block address and the y-axis is host write count and shows host write counts for logical block addresses at this first exemplary point in time.

Host write counts are updated when a corresponding logical block address is written to by the host. For example, a host write from a host to a solid state storage controller may take the form:

write <logical block address> <host data> and the host write count associated with the logical block address in the write instruction is incremented. In this particular example there is a counter for each logical block address. Some other embodiments for tracking host write counts which use shared host write counters and are thus less memory intensive are described in further detail below. The host write count tracks only host writes and excludes overhead writes (e.g., related to garbage collection or wear leveling) which are not triggered by a host write.

The diagram shown here is a "genie" diagram in the sense that the proper or correct group is known for each data point. This is a convenience in order to explain the technique. In practice, count thresholds may be used to separate one group from another. For example, the first count threshold (210) may be used to separate hot data from warm data, and the second count threshold (212) may be used to separate warm data from cold data. In some embodiments, count thresholds are determined as part of host traffic profiling (e.g., part of step 100 in FIG. 1). Note that with count thresholds 210 and 212, some of the data points will be incorrectly classified (e.g., "+" marks which are greater than the second count threshold (212) will be incorrectly classified as warm data when they should be classified as cold data). For the most part though, the exemplary thresholds shown are sufficient for knowing how to assign or classify host data into one of the three traffic groups in the sense that most of the traffic will be properly assigned to its correct traffic group. In some embodiments, a host traffic profiler (e.g., which performs step 100 in FIG. 1) analyzes host writes and determines count thresholds, such as count thresholds 210 and 212.

As used herein, the terms hot data, warm data, cold data, or any other reference to the temperature of data refers to the frequency with which a logical block address is rewritten or otherwise updated. For example, data (e.g., written to a given logical block address) that is frequently written or updated is considered hot. For example, a backup application may overwrite older backups with newer backups and the same logical block addresses are rewritten over and over. Note that traffic group 200 has the highest host write counts of the three groups. This makes sense because that data corresponds to hot data which is frequently updated.

Data that is infrequently or never updated after being initially written is called cold data. For example, digital photographs, music, and movies tend to be stored once and never updated. Note that the host write count of the third traffic group (204) has the lowest host write counts of the three groups shown, which makes sense since it comprises cold data which is rarely updated.

Warm data refers to data that is updated with moderate frequency. The host write counts of the second traffic group (202) have higher host write counts than the cold data (204) but lower host write counts than the hot data (200).

For convenience, the three traffic groups shown here have contiguous ranges of logical block addresses in order to clearly describe the technique. Hot data (200) corresponds to logical block addresses [0, 49], warm data (202) corresponds to logical block addresses [50, 199], and cold data (204) corresponds to logical block addresses [200, 999]. In the real world, a traffic group may include or corresponds to non-contiguous logical block addresses (e.g., a group could include the logical block addresses [0, 49] and [198, 202]).

Although this example and other examples described herein show traffic groups that divide traffic up according to temperature, any type of grouping may be used. In some other embodiments, traffic groups correspond to traffic type, such as OS traffic, file system traffic, journaling traffic, compaction traffic, etc. . . . .

Returning to step 100 in FIG. 1, a traffic profile would be generated for each of traffic groups 200, 202, and 204. The following figure shows an example of traffic profiles corresponding to traffic groups 200, 202, and 204.

Figure 3:
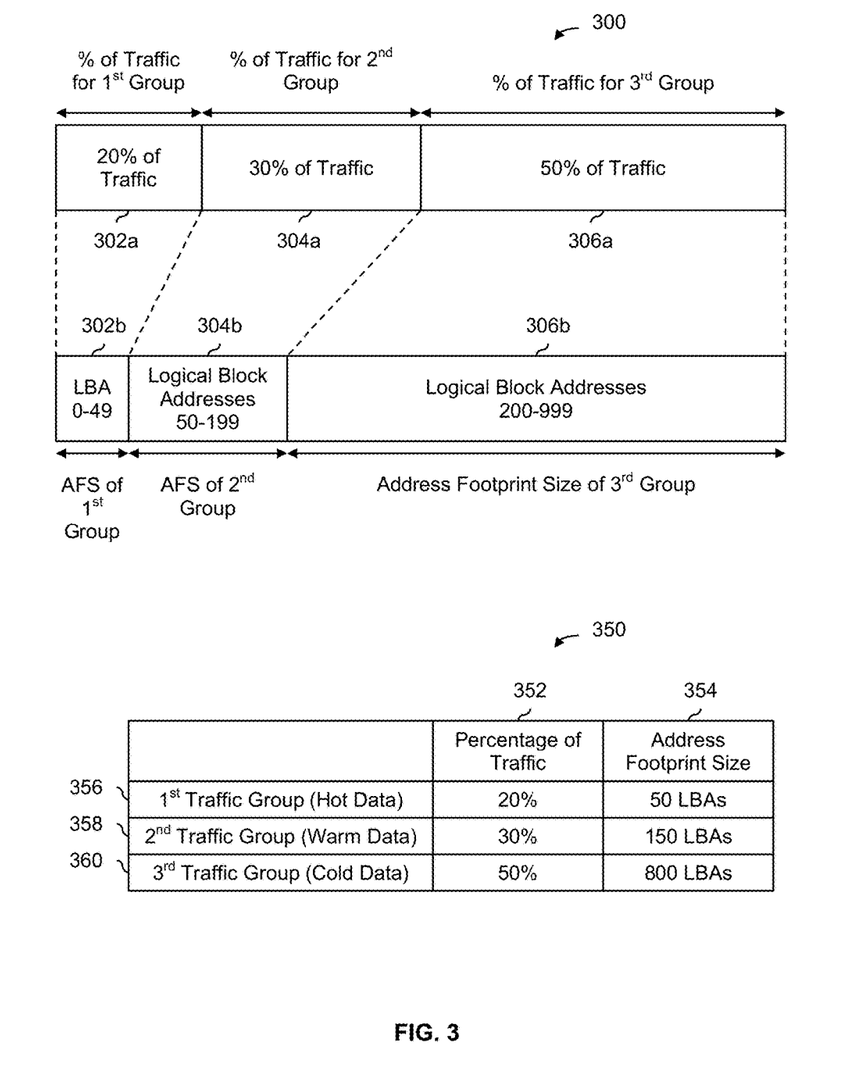
FIG. 3 is a diagram illustrating an embodiment of traffic profiles which include a percentage of traffic and an address footprint size.

FIG. 3 is a diagram illustrating an embodiment of traffic profiles which include a percentage of traffic and an address footprint size. As described above, a percentage of traffic is one example of a share of traffic. FIG. 3 builds upon the example of FIG. 2 and the traffic profiles described herein are built off of the traffic groups shown in FIG. 2.

In diagram 300, the traffic profiles are shown in graphical form where the widths in diagram 300 corresponds to the value of a particular field. (For readability reasons, diagram 300 is not exactly to scale in order to allow the descriptors to fit.) Percentage 302a and address footprint size 302b correspond to the first traffic group (hot data 200 in FIG. 2), percentage 304a and address footprint size 304b correspond to the second traffic group (warm data 202 in FIG. 2), and percentage 306a and address footprint size 306b correspond to the third traffic group (cold data 204 in FIG. 2). The top row in diagram 300 shows the percentage of traffic for each traffic group and the bottom row in diagram 300 shows the address footprint size for each traffic group. Note that the percentage of traffic relates to host data and excludes overhead writes.

In some embodiments, the following equations are used to obtain percentages for the three exemplary groups:

% of Total Traffic for 1st Group =

$$\frac{\sum_{i=0}^{i=49} \langle \text{Host Write Count at } LBA\ i \rangle}{\sum_{j=0}^{j=999} \langle \text{Host Write Count at } LBA\ j \rangle} \times 100\%$$

% of Total Traffic for 2nd Group =

$$\frac{\sum_{i=50}^{i=199} \langle \text{Host Write Count at } LBA\ i \rangle}{\sum_{j=0}^{j=999} \langle \text{Host Write Count at } LBA\ j \rangle} \times 100\%$$

% of Total Traffic for 3rd Group =

$$\frac{\sum_{i=200}^{i=999} \langle \text{Host Write Count at } LBA\ i \rangle}{\sum_{j=0}^{j=999} \langle \text{Host Write Count at } LBA\ j \rangle} \times 100\%$$

Alternatively, a finite number of the most recent logical block addresses written to by host writes may be saved and used to determine the percentages. For example, the last 1,000 logical block addresses written to by the last 1,000 host writes may be saved in a first-in, first-out (FIFO) type of buffer. In such embodiments, the percentages would be calculated as follows:

% of Total Traffic for 1st Group =

$$\frac{\#\ of\ LBAs\ \text{from 1st Group in } FIFO}{1000} \times 100\%$$

% of Total Traffic for 2nd Group =

$$\frac{\#\ of\ LBAs\ \text{from 2nd Group in } FIFO}{1000} \times 100\%$$

% of Total Traffic for 3rd Group =

$$\frac{\#\ of\ LBAs\ \text{from 3rd Group in } FIFO}{1000} \times 100\%$$

The address footprint size is the number of logical block addresses that fall into a given group. In FIG. 2, for example, this roughly corresponds to the widths of groups 200, 202, and 204, respectively. As such, the address footprint size may be calculated as follows:

Address Footprint Size for 1st Group=49−0+1=50

Address Footprint Size for 2nd Group=199−50+1=150

Address Footprint Size for 3rd Group=999−200+1=800

Diagram 350 shows the same traffic profiles in table format. Column 352 shows the percentage of traffic for each traffic group and column 354 shows the address footprint size (i.e., the number of logical block addresses falling into that group). Row 356 corresponds to the first traffic group (i.e., the hot data), row 358 corresponds to the second traffic group (i.e., the warm data), and row 360 corresponds to the third traffic group (i.e., the cold data).

Figure 4:
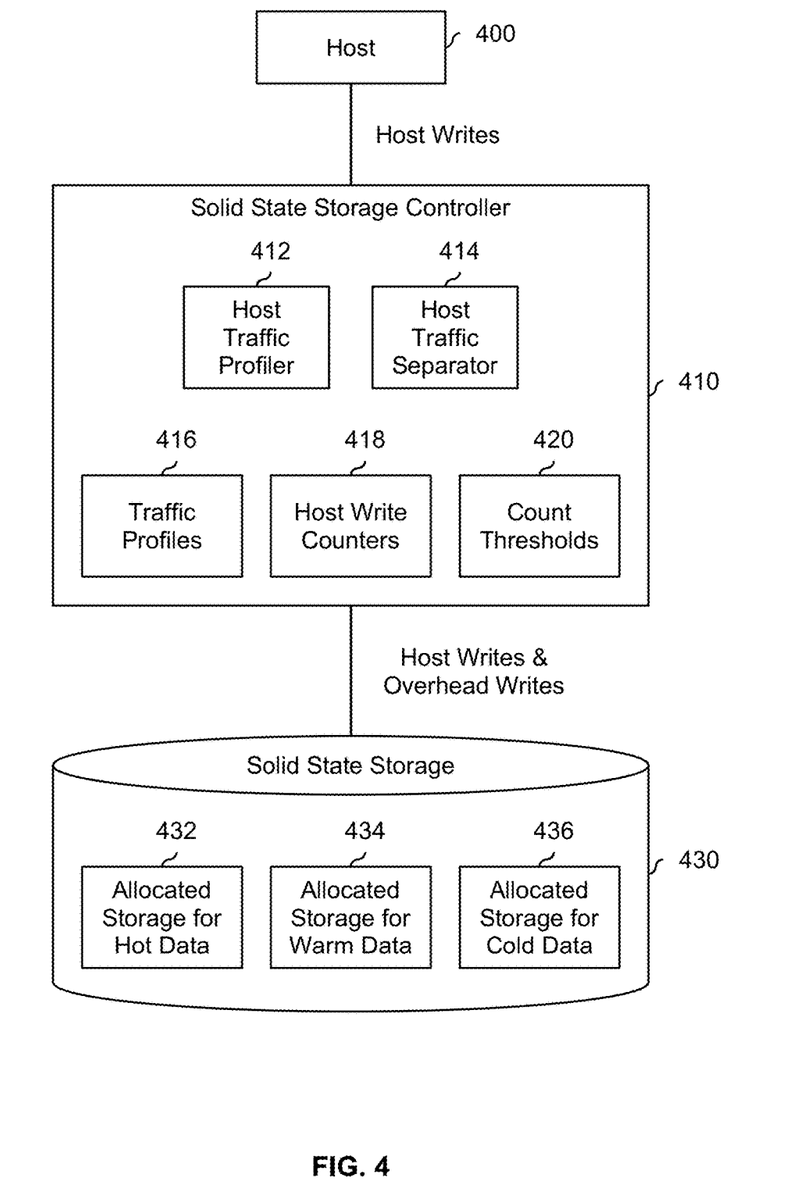
FIG. 4 is a diagram illustrating an embodiment of a solid state storage system which performs data separation at host write.

FIG. 4 is a diagram illustrating an embodiment of a solid state storage system which performs data separation at host write. Solid state storage controller 410 shows one example of a component which performs the process of FIG. 1. In some embodiments, solid state storage controller 410 is implemented on a semiconductor device, such as a field-programmable gate array (FPGA) or an application-specific integrated circuit (ASIC).

In the example shown, host 400 sends host writes to solid state storage controller 410. As described above, the format of a host write might be:

write <logical block address> <host data>.

Host write counters 418 are used to track the number of host writes to each LBA. For simplicity, in this example there is one counter per LBA. As such, when a host write is received (e.g., having the format described above), the counter corresponding to the logical block address is incremented.

Initially, solid state storage controller 410 waits until a sufficient number of host writes have been received (e.g., some threshold is satisfied) before making use of the host write counts. Once a sufficient number of host writes have been received, host traffic profiler 412 uses the host write counts to perform a first or initial grouping. (Host traffic profiler 412 is one example of a component that performs step 100 in FIG. 1.) In this example, a k-means grouping is used, where k is the number of groups desired (e.g., k=3 in the example of FIG. 2). The k-means grouping takes as its inputs the host write counts for each LBA and k (e.g., k=3). It then outputs the LBAs that fall into each group during this first or initial grouping; naturally, the members of the group may change over time.

Once the initial groupings are determined, initial values of the count thresholds (420) are determined (e.g., by host traffic profiler 412). In this example, this is done by first obtaining initial values of the size, cluster mean, and cluster maximum for each traffic group. The cluster mean is the mean value, and the cluster maximum is the maximum value of each traffic group. From there, the cluster means and/or the cluster maximums may be used to obtain the cluster thresholds. For example, the mid-point between two cluster means may be used as a count threshold between those two traffic groups. In another example, the count threshold may be between the cluster maximum of one traffic group and the cluster mean of another traffic group. Count thresholds 210 and 212 in FIG. 2 are examples of count thresholds that may be generated by host traffic profiler 412 and/or stored in 420.

The initial grouping also permits the initial traffic profiles (stored in 416) to be generated. For example, using the equations described above, host traffic profiler 412 may generate percentages of traffic and address footprint sizes for each traffic group and store them in 416. The traffic profiles in table form shown in diagram 350 in FIG. 3 are an example of traffic profiles stored in 416.

Once enough host writes have been processed by host traffic profiler 412 and initial values of the count thresholds (420) have been generated, host traffic separator 414 begins classifying the host writes that are received. Host traffic separator 414 is one example of a component that performs step 106 in FIG. 1. As an example of this process, host traffic separator 414 obtains the LBA included in a host write. Using the LBA, host traffic separator 414 obtains the corresponding host write count from host write counters 418. Host traffic separator 414 then compares the obtained host write count against the count thresholds stored in 420. Depending upon the comparison, the host write is categorized accordingly. Using FIG. 2 as an example, if the obtained host write count is greater than first count threshold 210, the host write is classified as hot data; if the obtained host write count is greater than second count threshold 212 and less than first count threshold 210, the host write is classified as warm data; if the obtained host write count is less than second count threshold 212, the host write is classified as cold data.

Then, depending upon the classification determined by host traffic separator 414, the host write is stored in the allocated storage for hot data (432), the allocated storage for warm data (434), or the allocated storage for cold data (436), all of which are in solid state storage 430. In some embodiments, a storage interface (not shown) in solid state storage controller 410 performs the host write from solid state storage controller 410 to solid state storage 430.

It is noted that the sizes of allocated storage 432, 434, and 436 depend respectively upon the corresponding traffic profiles. Initially, default sizes may be used to size storage 432, 434, and 436 until enough host writes have been received and the traffic profiles are believed to be accurate and/or stable enough to determine amounts of storage to allocate to each traffic group. Periodically, storage 432, 434, and 436 may be resized. In one example where there is over-provisioning and the traffic profiles in FIG. 3 are used, the sizes of allocated storage 432, 434, and 436 are:

Allocated Storage for Hot Data=50 LBAs+<Amount of $OP$>·$f$(20%,50 LBAs)

Allocated Storage for Warm Data=150 LBAs+ <Amount of $OP$>·$f$(30%,150 LBAs)

Allocated Storage for Hot Data=800 LBAs+ <Amount of $OP$>·$f$(50%,800 LBAs)

where the function $f(\ )$ outputs a percentage. This ensures that the amount of allocated storage is at least as big as the corresponding address footprint size, possibly with some over-provisioning as well.

In some embodiments, the frequency at which host traffic profiler 412 re-clusters the host writes (i.e., performs host traffic profiling) is adjusted according to the processing resources of the system. If there is a lot processing resources available (e.g., in enterprise applications), then the grouping process can be run periodically with each write and/or after a decaying operation is performed. If there are limited processing resources available (e.g., in consumer and/or mobile applications), then the grouping process in some embodiments is run only when a traffic pattern change is detected. For example, to detect a traffic pattern change, the traffic group that each LBA is assigned to can be recorded. If the current cluster assignment differs from the previously recorded cluster assignment for an LBA being written to, then the grouping process (e.g., k-means) will be re-run. In some embodiments, the frequency at which re-grouping is performed is bounded above and below.

In some cases, one or more host write counts in a traffic group (typically the hot data group) will have saturated to some maximum value. For example, if 6-bit counters are used, then the host write count saturates at a value of 63. In some embodiments, when k-means grouping is used and some of the host write counts have saturated, any saturated host write count is replaced with an unsaturated mean (e.g., of the host write counts) for that saturated traffic group (typically the hot data group) before being input to the k-means grouping process (e.g., to update the groups give current conditions). This replacement may be desirable because it is not too memory intensive to track a unsaturated mean (e.g., since it is a single value as opposed to many values) but provides a slightly better input for the k-means grouping compared to the saturated value (e.g., if the host write counts remain saturated for some time and the actual counts are much higher than the saturated values).

In some cases, the number of open blocks does not equal the number of traffic groups. For example, k=3 (e.g., hot data group, warm data group, and cold data group) but there may only be two open blocks to write to at any given time and thus the three exemplary traffic groups must be combined in some way into two groups. In some embodiments, some transformation of the host write counts is performed before the host write counts are input to the k-means grouping process. The k-means grouping process groups counts by their differences (which for the reasons described below may be undesirable if untransformed host write values are input). If a first traffic group has a mean count of 100 ($\mu_{c1}$=100), a second traffic group has a mean count of 20 ($\mu_{c2}$=20), and a third traffic group has a mean count of 2 ($\mu_{c3}$=2), then to create 2 clusters, the k-means grouping process will group clusters 2 and 3 together since their difference is smaller (assuming the host write counts are not modified before being input to the k-means grouping process). However, to minimize write amplification, it would be preferable to group the counts according to the ratio of their counts, not the difference. That is, cluster 1 and cluster 2 should be grouped together if:

$$\frac{\mu_{c1}}{\mu_{c2}} < \frac{\mu_{c2}}{\mu_{c3}}$$

or if $$\log_2(\mu_{c1}) - \log_2(\mu_2) < \log_2(\mu_2) - \log_2(\mu_{c3}).$$

Thus, inputting the $\log_2$ values of the host write counts into the k-means grouping process produces the desired grouping when there is a difference in the number of open blocks compared to the number of traffic groups.

The following figure shows an example of a memory efficient way to track host write counts.

Figure 5:
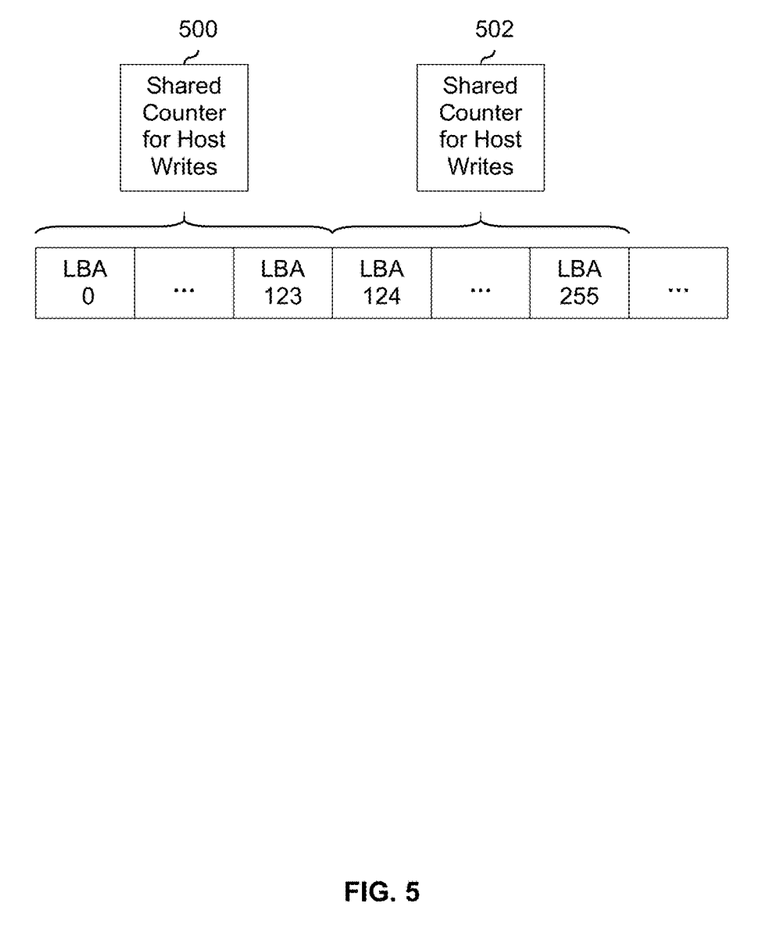
FIG. 5 is a diagram showing an embodiment of shared host write counters.

FIG. 5 is a diagram showing an embodiment of shared host write counters. For applications where the amount of memory consumed is not an issue, each LBA may have its own counter to track host write count. For example, in enterprise applications, performance tends to be more important than saving money or power. However, for applications where the amount of memory consumed is a concern (e.g., mobile applications or consumer applications), multiple LBAs may share a counter.

In this example, to take advantage of spatial locality, neighboring LBAs share the same counter. Host data tends to exhibit both temporal and spatial locality. That is, LBAs that are written together in time or are close together address-wise are often of the same temperature. We take advantage of this property with shared counters.) LBA 0-LBA 123 share a counter (500), LBA 124-LBA 255 share a counter (502), and so on. A hash function may be used to determine or otherwise map to the counter used by a particular LBA (e.g., counter identifier=hash(LBA)).

When multiple LBAs share a counter, collisions can occur. For example, suppose a large sequential write is being performed where LBA 0-LBA 123 are being written. In this example, LBA 0-LBA 123 all share the same counter and it would not be desirable if that shared counter is incremented 124 times. It would instead be preferable if the shared counter were only incremented once (e.g., since each LBA is individually only written once). To avoid such collisions, only the first LBA of a sequential write is used when incrementing shared counters (in this example). That is, the writes to LBA 1-LBA 123 would be ignored, and only the write to LBA 0 would be evaluated, causing shared counter 500 to be incremented only one time.

Another problem with host write counters is that it may be difficult for the cold data group and the warm data group of separate from each other (with respect to their host write counts) before the hot data groups saturates. The following figure shows an example of this problem and describes an embodiment of a solution to address this.

Figure 6:
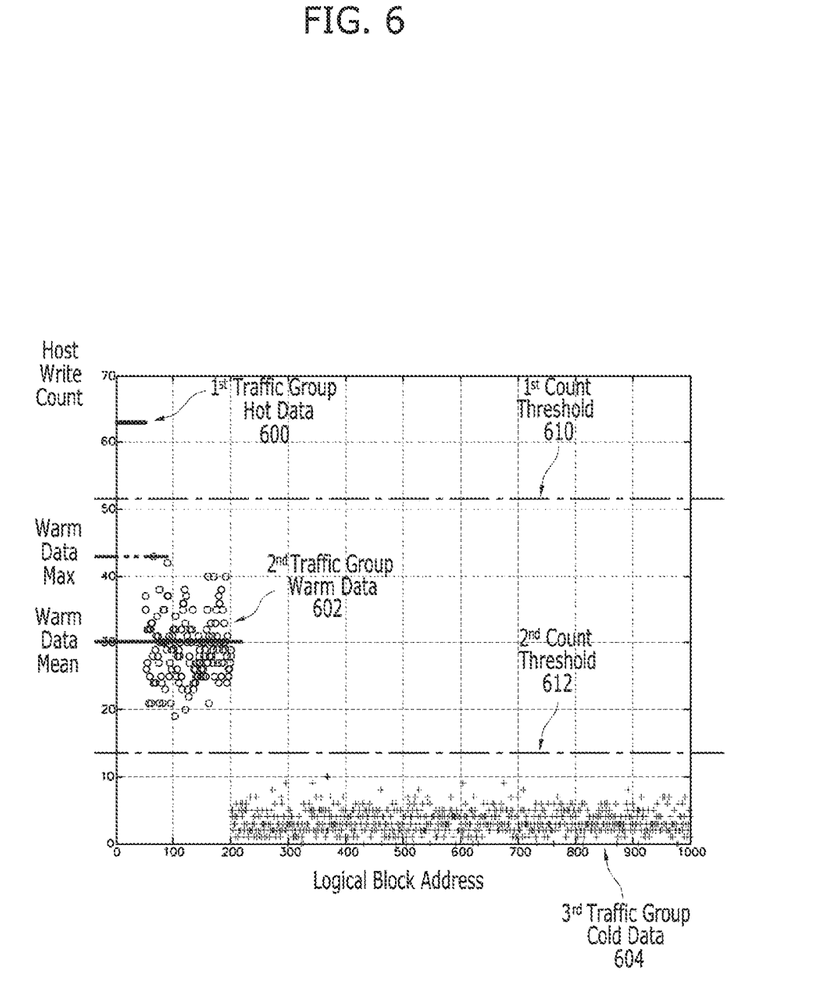
FIG. 6 is a diagram illustrating an embodiment of host write counts associated with three traffic groups at a second point in time.

FIG. 6 is a diagram illustrating an embodiment of host write counts associated with three traffic groups at a second point in time. FIG. 6 continues the example of FIG. 2 and shows the host write counts at a later point in time than that shown in FIG. 2. In this example, the host write counters have 6 bits, so the counters can count from 0 to 63, at which point the counter is saturated (e.g., until it is reset or decayed).

Because of the nature of hot data, the host write counts for the hot data (600) accumulates faster than the host write counts for warm data (602) and cold data (604). At the point in time shown, the host write counters for the hot data (600) have saturated at 63.

In this example, the host write counts of the hot data (600) have been allowed to saturate and remain saturated (e.g., at 63) while the host write counts for the warm data (602) and cold data (604) keep growing. That is, the decay operation (e.g., halving the host write counts) is delayed and is not immediately triggered when saturation is close to happening or has already happened for the hot data group. Delay of the decay operation permits the host write counts for the warm data and cold data to better separate themselves from each other. Note, for example, that there is good separation between the lowest host write count in the warm data group (602) and the highest host write count in the host write count in the cold data group (604). For example, the second count threshold (612) perfectly separates the warm data (602) and the cold data (604) and would not incorrectly categorize an LBA in one group as being in the other group. Even if the host write counts were halved, the warm data and the cold data would have good separation.

In contrast, the host write counts for the warm data (202) and cold data (212) at the point in time shown in FIG. 2 are not as well separated and are closer together. For example, the second threshold count (212) is an imperfect divider between the warm data and cold data since some warm data will be incorrected categorized as cold data and vice versa because they are on the wrong side of the threshold. Some other systems or techniques may perform the decay operation (e.g., halving all of the host write counts) at the point in time shown in FIG. 2 instead of holding off a little longer (e.g., until the point in time shown in FIG. 6). Performing a decay operation before the warm data and cold data have had an opportunity to separate from each other is undesirable because the host write counts would remain "bunched together."

Having good separation between traffic groups is desirable because it permits better host traffic profiling and received host data can be better categorized into its proper traffic group. To put it another way, warm data can be better recognized as being warm data and cold data can be better recognized as cold data if there is better separation between the two groups by holding off on performing a decaying operation and permitted some host write counts to saturate.

The following figures show examples of processes for manage host write counts, including incrementing host write counts when shared counters are used and performing a decay operation.

Figure 7A:
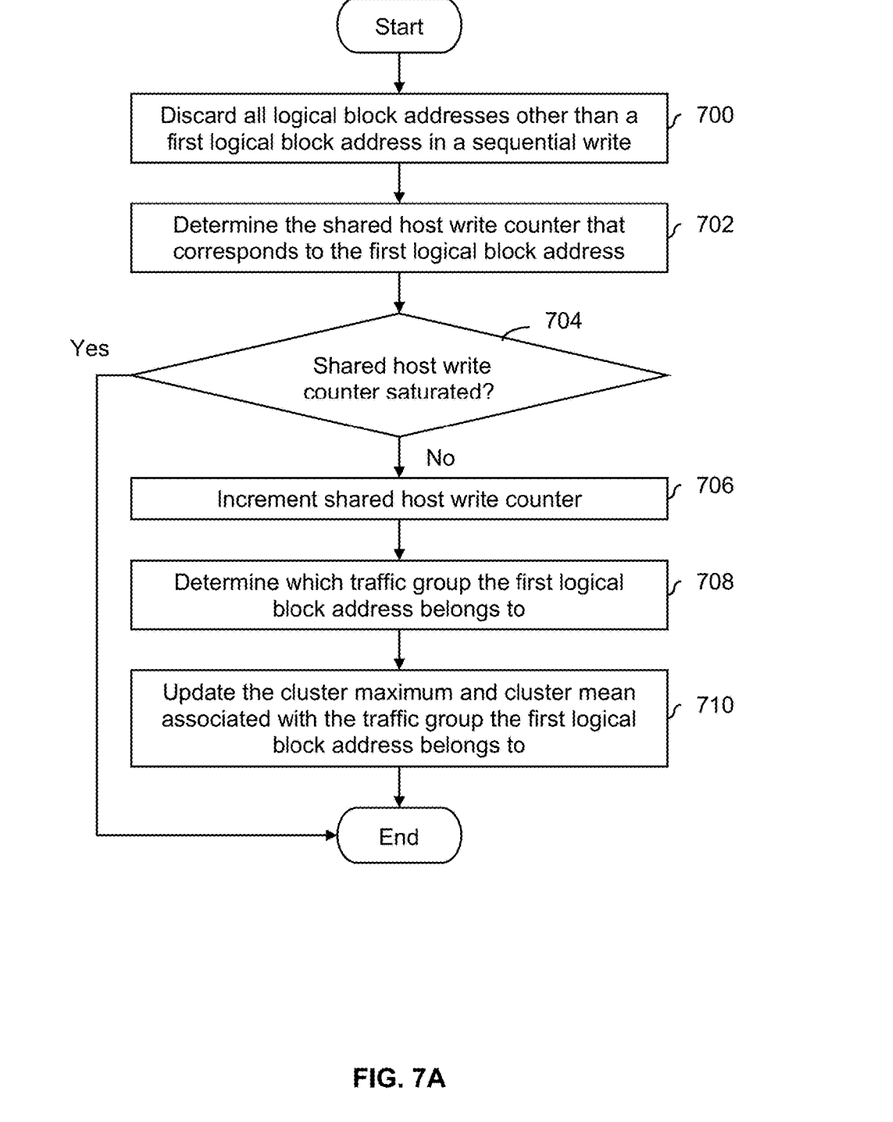
FIG. 7A is a flowchart illustrating an embodiment of a process to increment host write counts when shared counters are used.

FIG. 7A is a flowchart illustrating an embodiment of a process to increment host write counts when shared counters are used. In the context of FIG. 1, FIG. 7A may be included in step 100 as part of host traffic profiling. In some embodiments, host traffic profiler 412 in FIG. 4 performs the process of FIG. 7A. In this particular example, it is assumed that shared host write counters are used and a sequential write (e.g., to multiple LBAs) has occurred. Naturally, the exemplary process may be modified accordingly if there are no shared host write counters and/or no sequential write has occurred.

At 700, all logical block addresses other than a first logical block address in a sequential write are discarded. As described above, discarding all but the first LBA permits a more accurate count when host write counters are shared are amongst multiple LBAs and a sequential write (e.g., to multiple LBAs) has occurred. For example, if a sequential write to LBA 50-LBA 173 has occurred, then only LBA 50 would be kept and LBA 51-LBA 173 would be discarded. Any reduction method may be used. In another example, LBAs 50, 100, and 150 are kept while the rest are discarded. This may, for example, be useful when a single counter is shared over many LBAs and sequential writes of varying lengths occur where the write lengths are shorter than the number of shared LBAs per counter. Keeping a few (but not all) of the LBAs would capture a sense of how long the sequential write was.

At 702, the shared host write counter that corresponds to the first logical block address is determined. For example, in FIG. 5, if the first LBA from step 700 is LBA 0, then the corresponding host write counter is counter 500. In some embodiments, a hash function is used at step 702 (e.g., counter identifier=hash(first LBA)).

At 704, it is determined if the shared host write counter is saturated. For example, if 6-bit counters are used, then the counter is saturated if the count value is 63. If the counter is saturated at 704, then the process ends (e.g., without changing the count value such that the count value remains saturated at 63). It is noted that saturated values either remain saturated (e.g., remain at 63) or are decayed (e.g., by halving the value of 63 to be either 31 or 32), but the saturated value is not permitted to roll over (e.g., go from 63 to 0).

If the counter is not saturated at 704, then the shared host write counter is incremented at 706.

At 708, it is determined which traffic group the first logical block address belongs. In some embodiments, step 708 includes obtaining the host write count that corresponds to the first LBA and determining what traffic group that host write count falls into based on one or more count thresholds (e.g., in FIG. 6, is the host write count greater than the first count threshold (610), between the first count threshold (610) and the second count threshold (612), or less than the second count threshold (612).

At 710, the cluster maximum and cluster mean associated with the traffic group which the first logical block address belongs to is updated. For example, if step 708 classifies the first logical block address into the warm data group (602 in FIG. 6), the warm data maximum of 42 (shown with a dot-dot-dash line in FIG. 6) would be incremented by one if the first LBA at step 700 corresponds to warm data maximum. The warm data mean of 30 (shown with a solid line in FIG. 6) is increased by 1/n where there are n elements in the warm data group (602 in FIG. 6).

Figure 7B:
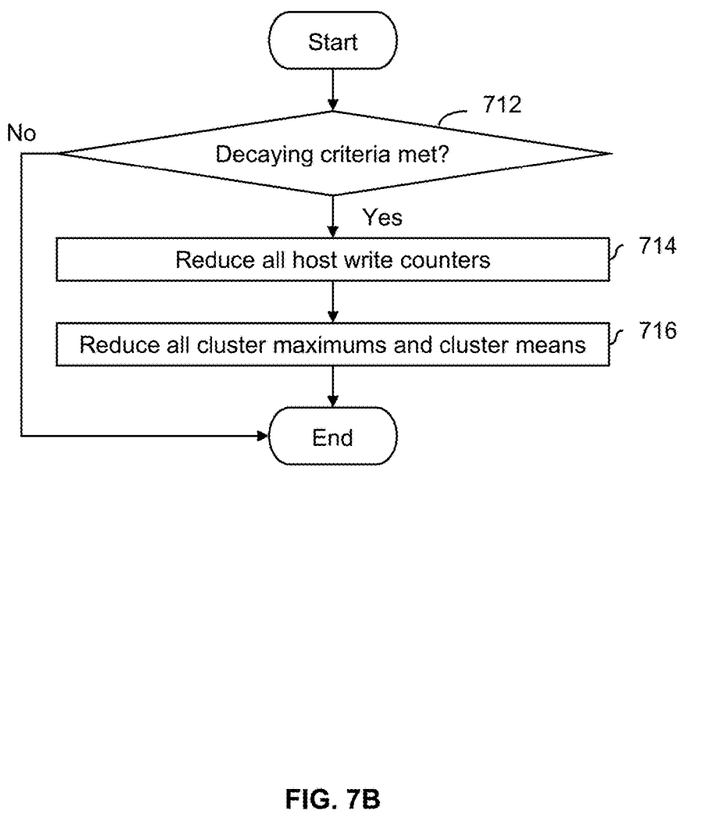
FIG. 7B is a flowchart illustrating an embodiment of a decaying process.

FIG. 7B is a flowchart illustrating an embodiment of a decaying process. In the context of FIG. 1, FIG. 7B may be included in step 100 as part of host traffic profiling.

At 712, it is determined if one or more decaying criteria is/are met. For example, the decaying operation may be triggered when two groups (e.g., other than the saturated group) are about to merge. Using FIG. 6 as an example, a decaying operation may be triggered when the warm data (602) and the cold data (604) are about to merge. Such a criteria can be set up using the cluster maximums and cluster means that are tracked for each traffic group. In one example, if either:

|(Cluster Max for Warm Data)−(Cluster Max for Cold Data)|<$Threshold_1$ or

|(Cluster Mean for Warm Data)−(Cluster Mean for Cold Data)|<$Threshold_2$ then the decaying criteria is satisfied.

If the decaying criteria is/are determined to be satisfied at step 712, then at 714 all of the host write counters are reduced (e.g., the saturated group as well as the unsaturated group(s)). For example, the counts may be halved (e.g., because halving may be easy to implement in binary logic). At 716, all cluster maximums and cluster means are reduced. For example, if the host write counters are halved at step 714, the associated cluster maximums and cluster means are also halved at step 716.

If the decaying criteria is/are not satisfied at step 712, then the host cluster counts, cluster means, and cluster maximums are left unchanged (i.e., because a decaying operation is not being performed).

Returning to FIG. 4, over time, the amounts of solid state storage allocated to hot data (432), warm data (434), and cold data (436) will change. The following figure describes a garbage collection process which may be used to gradually or otherwise incrementally adjust allocated storage to desired sizes. Generally speaking, garbage collection is a process where valid pages in a source block are copied to a destination block and invalid pages in the source block are discarded or otherwise left behind. This consolidates valid pages together and frees up the source block to be an empty block.

Figure 8:
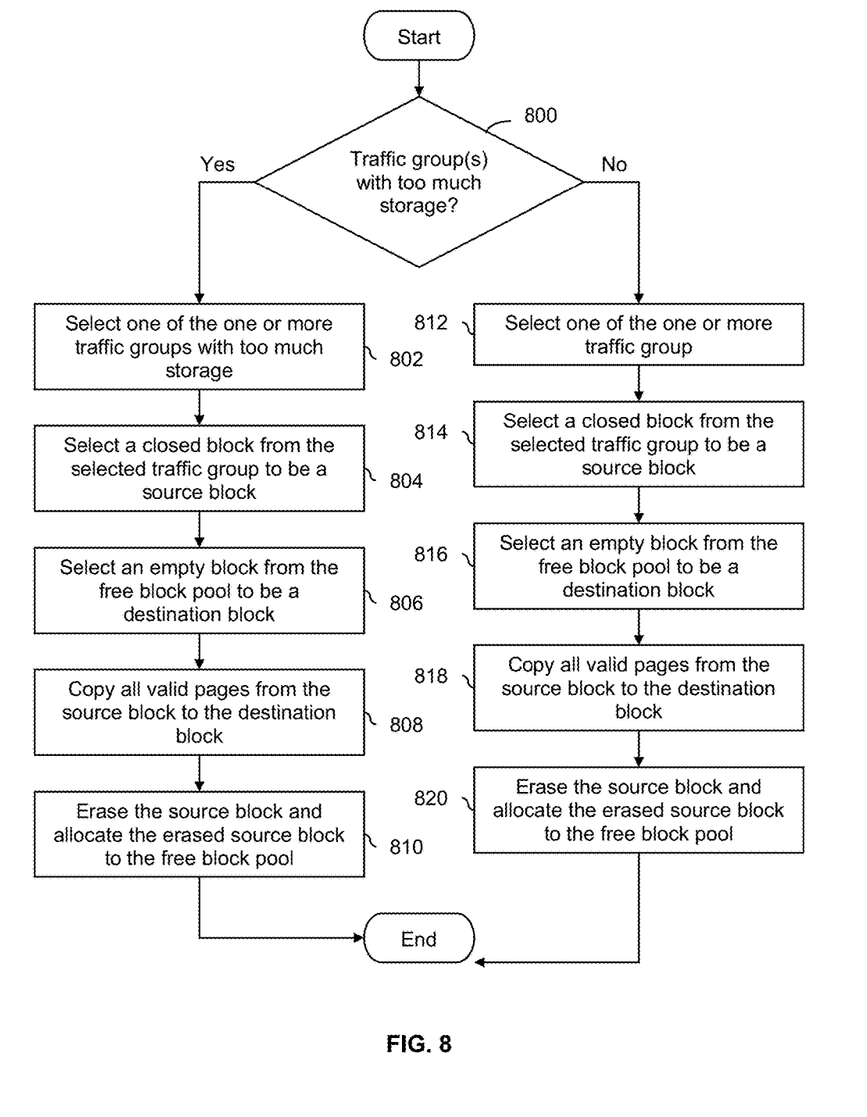
FIG. 8 is a flowchart illustrating an embodiment of a garbage collection process.

FIG. 8 is a flowchart illustrating an embodiment of a garbage collection process. Although not shown in FIG. 4, in some embodiments this process is performed by a garbage collector in solid state storage controller 410. The process of FIG. 8 may be performed in combination with the process of FIG. 8 (e.g., when the actual amounts of storage allocated deviate from desired amounts because of changes in the traffic profiles).

At 800, it is determined if there are one or more traffic groups with too much storage. For example, suppose the allocated storage for hot data (432 in FIG. 4) is greater than some desired amount, the allocated storage for warm data (434 in FIG. 4) is less than some desired amount, and the allocated storage for cold data (436 in FIG. 4) is exactly at some desired amount. In this example, the decision at 800 would be Yes because the hot data group has too much storage allocated (e.g., based on the current traffic profile for the hot data group).

If there are one or more traffic groups with too much storage at step 800, then one of the one or more traffic groups with too much storage is selected at 802. If there is one traffic group with too much storage, this is a straightforward step. If there are two or more traffic groups with too much storage, one of the groups may be selected randomly, or the traffic group with the most excess storage (e.g., by percentage or bytes) is selected.

At 804, a closed block from the selected traffic group is selected to be a source block. In one example, a closed block with the most invalid pages is picked from the selected group (e.g., the hot data group). As used herein, a closed block refers to a block that is storing some combination of valid data and invalid data, an open block refers to a block that is partially written and/or is currently being written to, and an empty block refers to a block that is not storing anything.

At 806, an empty block is selected from the free block pool to be a destination block. In this embodiment, free or empty blocks are not grouped or otherwise segregated by temperature. That is, there is a common or shared pool of free or empty blocks from which the various traffic groups pick free blocks. Unlike closed blocks (i.e., blocks with stored data in them that have been completely written), empty blocks are not segregated into temperature groups. Selection of an empty block at step 806 may depend upon the temperature of the data. For example, if the garbage-collected source block is hot, the block with the lowest P/E count from the free block pool is selected. Similarly, in this example at least, if the garbage-collected source block is cold, the block with the highest P/E count is selected from the free block pool. Wear leveling may use a similar strategy.

At 808, all valid pages are copied from the source block to the destination block. In-place updates are not supported by solid state storage, and so out-of-date data is marked as invalid and is not copied over to the destination block when garbage collection is performed.

At 810, the source block is erased and the erased source block is allocated to the free block pool.

If it is determined at step 800 that there are no traffic groups with too much storage, then at 812 one of the one or more traffic groups is selected. For example, a traffic group having a block with the most invalid pages may be selected. If there is a tie for "block with most invalid pages" then the one with the lowest P/E cycle count may be selected.

At 814, a closed block is selected from the selected traffic group to be a source block. For example, a block having the most invalid pages in the selected group is picked.

At 816, an empty block is selected from the free block pool to be a destination block. As described above, there is a shared pool of empty or free blocks in this example. One of the selection techniques described above may be used (e.g., where data temperature and P/E count are used to make the selection).

At 818, all valid pages are copied from the source block to the destination block.

At 820, the source block is erased and the erased source block is allocated to the free block pool.

Using garbage collection to incrementally or gradually adjust the amounts of storage may be desirable because garbage collection has to be performed anyway, so no additional overhead writes have to be performed which would contribute (in a negative way) towards the write amplification.

Also, some solid state storage controllers track how many empty blocks there are so that it knows when to perform garbage collection (generally speaking, when there are only a few empty blocks left). If the amounts of storage were suddenly changed all at once to their new desired amounts (e.g., by assigning empty blocks from one traffic group to another), the solid state storage controller may suddenly start performing many garbage collections cycles. This may be undesirable because the many garbage collection operations may block or otherwise slow down requests from the host.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a host traffic profiler configured to determine a plurality of traffic profiles for a plurality of traffic groups, and to perform a decaying process triggered when at least one or more decaying criteria is met, wherein each traffic profile includes a share of traffic and an address footprint size associated with a corresponding traffic group, the decaying process reduces at least all host write counters, all cluster maximums, and all cluster means, and the decaying criteria includes one or more of the following:
an absolute value of a difference between: (1) a first cluster maximum and (2) a second cluster maximum is less than a threshold; or
an absolute value of a difference between: (1) a first cluster mean and (2) a second cluster mean is less than a threshold;
a host interface configured to receive a host write from a host;
a host traffic separator configured to identify which one of the plurality of traffic groups the host write belongs to; and
a storage interface configured to store write data associated with the host write in a solid state storage allocated to the traffic group that the host write is identified as belonging to, wherein the amount of the solid state storage allocated to each of the plurality of traffic groups is adjustable based at least in part on the traffic profile of a given traffic group.

2. The system recited in claim 1, wherein the system includes a semiconductor device, including one or more of the following: a field-programmable gate array (FPGA) or an application-specific integrated circuit (ASIC).

3. The system recited in claim 1, wherein the plurality of traffic groups include one or more of the following: a hot data group, a warm data group, or a cold data group.

4. The system recited in claim 1, wherein the plurality of traffic groups is associated with a traffic type and include one or more of the following: OS traffic, file system traffic, journaling traffic, or compaction traffic.

5. The system recited in claim 1, wherein a plurality of logical block addresses share a host write counter and the host write includes a sequential write.

6. The system recited in claim 5, wherein the host traffic profiler is further configured to:
discard all logical block addresses other than a first logical block address in the sequential write;
determine a shared host write counter that corresponds to the first logical block address;
determine if the shared host write counter is saturated; and
in the event it is determined that the shared host write counter is not saturated:
increment the shared host write counter;
determine which traffic group in the plurality of traffic groups the first logical block address belongs to; and
update a cluster maximum and a cluster mean associated with the traffic group the first logical block address belongs to.

7. The system recited in claim 1 further comprising a garbage collector configured to:

determine if there are one or more traffic groups with too much storage; and in the event it is determined that there are one or more traffic groups with too much storage:
  select one of the one or more traffic groups with too much storage;
  select a closed block from the selected traffic group to be a source block;
  select an empty block from a free block pool to be a destination block;
  copy all valid pages from the source block to the destination block;
  erase the source block; and
  allocate the erased source block to the free block pool.

8. The system recited in claim 1, wherein:
a first traffic group, in the plurality of traffic groups, is associated with one or more saturated host write counts; and
the host traffic profiler is further configured to update the plurality of traffic groups using k-means grouping, including by replacing the one or more saturated host write counts with an unsaturated host write count mean before being input to the k-means grouping.

9. A method, comprising:
using a processor to determine a plurality of traffic profiles for a plurality of traffic groups, wherein each traffic profile includes a share of traffic and an address footprint size associated with a corresponding traffic group;
receiving a host write from a host;
identifying which one of the plurality of traffic groups the host write belongs to;
performing a decaying process triggered when at least one or more decaying criteria is met, wherein the decaying process reduces at least all host write counters, all cluster maximums, and all cluster means, the decaying criteria includes one or more of the following:
an absolute value of a difference between: (1) a first cluster maximum and (2) a second cluster maximum is less than a threshold; or
an absolute value of a difference between: (1) a first cluster mean and (2) a second cluster mean is less than a threshold; and
storing write data associated with the host write in a solid state storage allocated to the traffic group that the host write is identified as belonging to, wherein the amount of the solid state storage allocated to each of the plurality of traffic groups is adjustable based at least in part on the traffic profile of a given traffic group.

10. The method recited in claim 9, wherein the method is performed by a semiconductor device, including one or more of the following: a field-programmable gate array (FPGA) or an application-specific integrated circuit (ASIC).

11. The method recited in claim 9, wherein the plurality of traffic groups include one or more of the following: a hot data group, a warm data group, or a cold data group.

12. The method recited in claim 9, wherein the plurality of traffic groups is associated with a traffic type and include one or more of the following: OS traffic, file system traffic, journaling traffic, or compaction traffic.

13. The method recited in claim 9, wherein a plurality of logical block addresses share a host write counter and the host write includes a sequential write.

14. The method recited in claim 13 further comprising:
discarding all logical block addresses other than a first logical block address in the sequential write;
determining a shared host write counter that corresponds to the first logical block address;
determining if the shared host write counter is saturated; and
in the event it is determined that the shared host write counter is not saturated:
  incrementing the shared host write counter;
  determining which traffic group in the plurality of traffic groups the first logical block address belongs to; and
  updating a cluster maximum and a cluster mean associated with the traffic group the first logical block address belongs to.

15. The method recited in claim 9 further comprising:
determining if there are one or more traffic groups with too much storage; and
in the event it is determined that there are one or more traffic groups with too much storage:
  selecting one of the one or more traffic groups with too much storage;
  selecting a closed block from the selected traffic group to be a source block;
  selecting an empty block from a free block pool to be a destination block;
  copying all valid pages from the source block to the destination block;
  erasing the source block; and
  allocating the erased source block to the free block pool.

16. The method recited in claim 9, wherein:
a first traffic group, in the plurality of traffic groups, is associated with one or more saturated host write counts; and
the method further includes updating the plurality of traffic groups using k-means grouping, including by replacing the one or more saturated host write counts with an unsaturated host write count mean before being input to the k-means grouping.

17. A computer program product, the computer program product being embodied in a non-transitory computer readable storage medium and comprising computer instructions for:
determining a plurality of traffic profiles for a plurality of traffic groups, wherein each traffic profile includes a share of traffic and an address footprint size associated with a corresponding traffic group;
receiving a host write from a host;
identifying which one of the plurality of traffic groups the host write belongs to;
performing a decaying process triggered when at least one or more decaying criteria is met, wherein the decaying process reduces at least all host write counters, all cluster maximums, and all cluster means, and the decaying criteria includes one or more of the following:
an absolute value of a difference between: (1) a first cluster maximum and (2) a second cluster maximum is less than a threshold; or
an absolute value of a difference between: (1) a first cluster mean and (2) a second cluster mean is less than a threshold; and
storing write data associated with the host write in a solid state storage allocated to the traffic group that the host write is identified as belonging to, wherein the amount of the solid state storage allocated to each of the plurality of traffic groups is adjustable based at least in part on the traffic profile of a given traffic group.

* * * * *